(12) United States Patent
Takla

(10) Patent No.: US 11,445,325 B2
(45) Date of Patent: Sep. 13, 2022

(54) SYSTEMS AND METHODS FOR UTILIZING GEOFENCE AREAS AND MULTICASTING TO SHARE BASIC SAFETY MESSAGE DATA WITH VEHICLES

(71) Applicant: Verizon Patent and Licensing Inc., Basking Ridge, NJ (US)

(72) Inventor: Mourad B. Takla, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 32 days.

(21) Appl. No.: 16/949,782

(22) Filed: Nov. 13, 2020

(65) Prior Publication Data

US 2021/0176590 A1    Jun. 10, 2021

Related U.S. Application Data

(63) Continuation of application No. 16/704,728, filed on Dec. 5, 2019, now Pat. No. 10,848,907.

(51) Int. Cl.
| | |
|---|---|
| *H04W 4/021* | (2018.01) |
| *H04W 4/029* | (2018.01) |
| *G08G 1/00* | (2006.01) |
| *H04W 4/06* | (2009.01) |
| *H04W 64/00* | (2009.01) |
| *H04W 4/44* | (2018.01) |
| *H04W 4/02* | (2018.01) |

(52) U.S. Cl.
CPC ............ *H04W 4/021* (2013.01); *G08G 1/207* (2013.01); *H04W 4/023* (2013.01); *H04W 4/029* (2018.02); *H04W 4/06* (2013.01); *H04W 4/44* (2018.02); *H04W 64/006* (2013.01)

(58) Field of Classification Search
CPC ..... H04W 4/021; H04W 64/006; H04W 4/06; H04W 4/44; H04W 4/023; H04W 4/029; G08G 1/207
See application file for complete search history.

(56) References Cited

U.S. PATENT DOCUMENTS

| | | | |
|---|---|---|---|
| 2011/0009151 A1* | 1/2011 | Miucic | H04W 52/343 455/522 |
| 2017/0061790 A1* | 3/2017 | Jana | G08G 1/093 |
| 2017/0222990 A1* | 8/2017 | Romansky | H04L 9/3268 |
| 2017/0359769 A1* | 12/2017 | Martono | H04W 40/244 |
| 2018/0026792 A1 | 1/2018 | Ben Hamida et al. | |
| 2018/0257660 A1* | 9/2018 | Ibrahim | G01C 21/30 |

(Continued)

*Primary Examiner* — Minjung Kim

(57) ABSTRACT

A device may receive basic safety message (BSM) data from vehicles, and may determine, based on a quantity of the vehicles and speed data identified in the BSM data, a primary geofence area that includes a first set of the vehicles. The device may determine a secondary geofence area based on the speed data and the quantity of the vehicles, wherein the secondary geofence area is greater in size than the primary geofence area. The device may determine a difference between the primary geofence area and the secondary geofence area to generate a difference geofence area that includes a second set of the vehicles that is different than the first set of the vehicles. The device may generate a multicast message based on the BSM data associated with the second set of the vehicles, and may broadcast the multicast message to the first set of the vehicles.

20 Claims, 18 Drawing Sheets

(56) References Cited

U.S. PATENT DOCUMENTS

2020/0065443 A1   2/2020  Liu et al.
2020/0168080 A1*  5/2020  Kim ..................... B60W 30/18
2020/0226928 A1*  7/2020  Hsu ........................ H04W 4/40

* cited by examiner

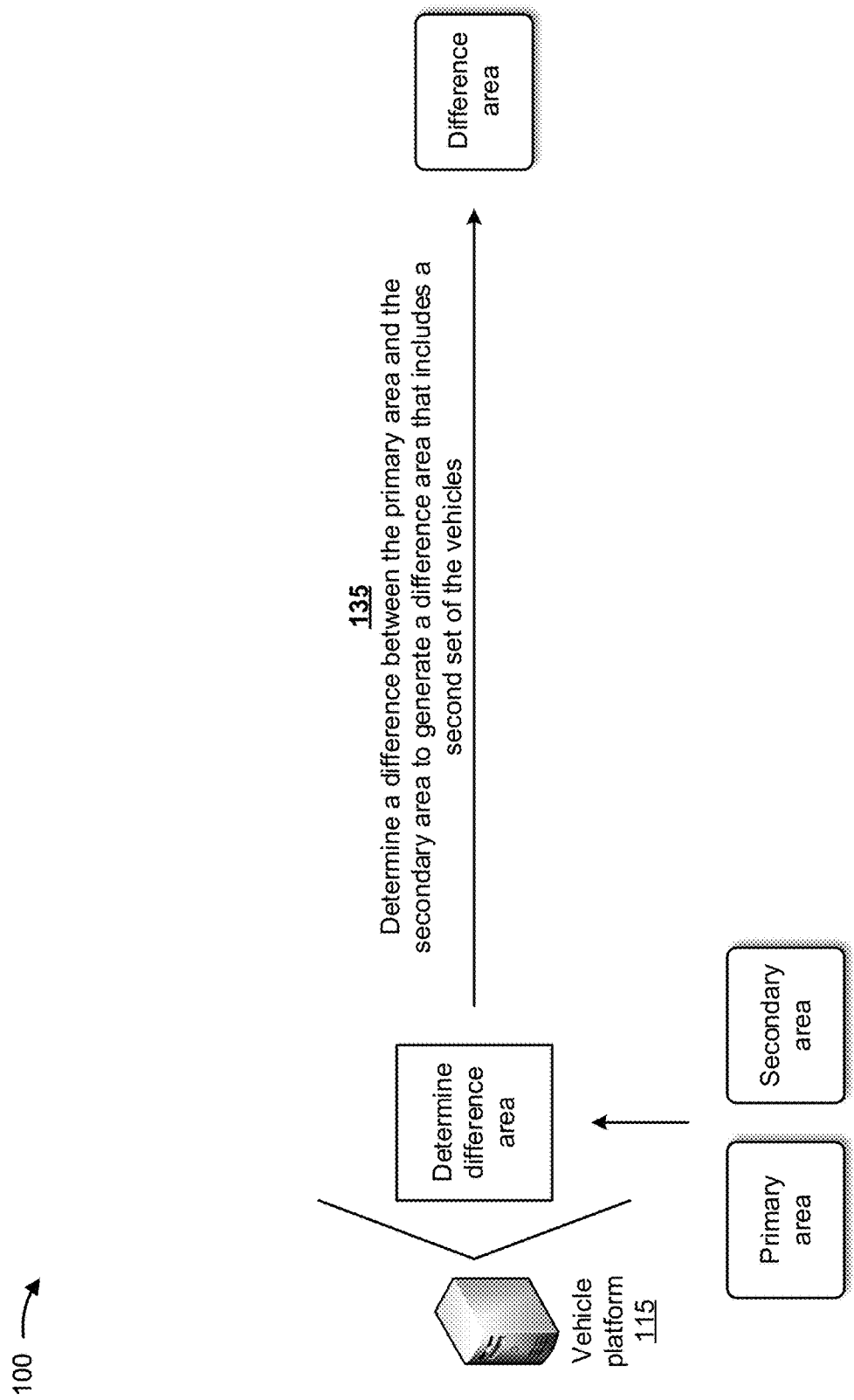

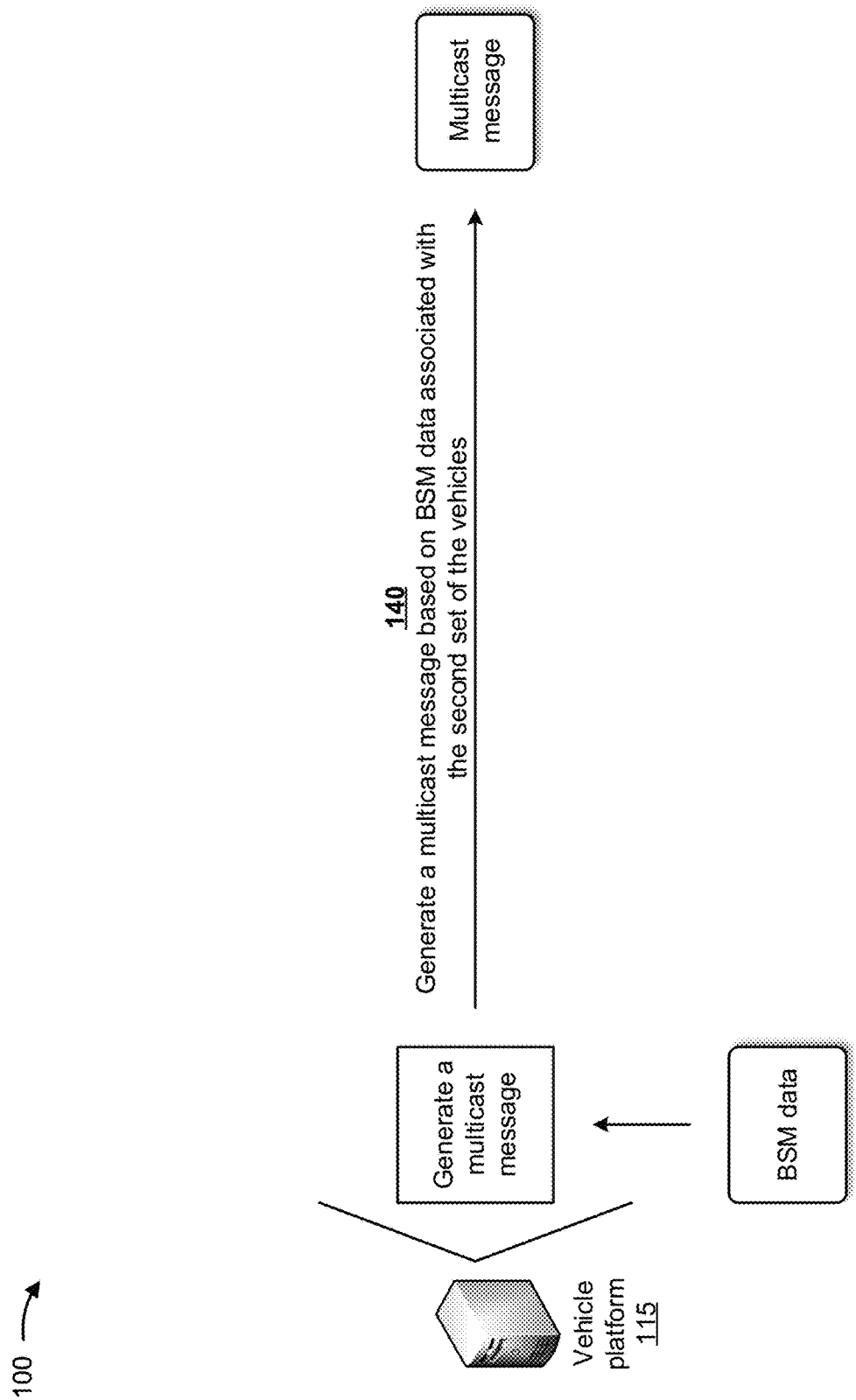

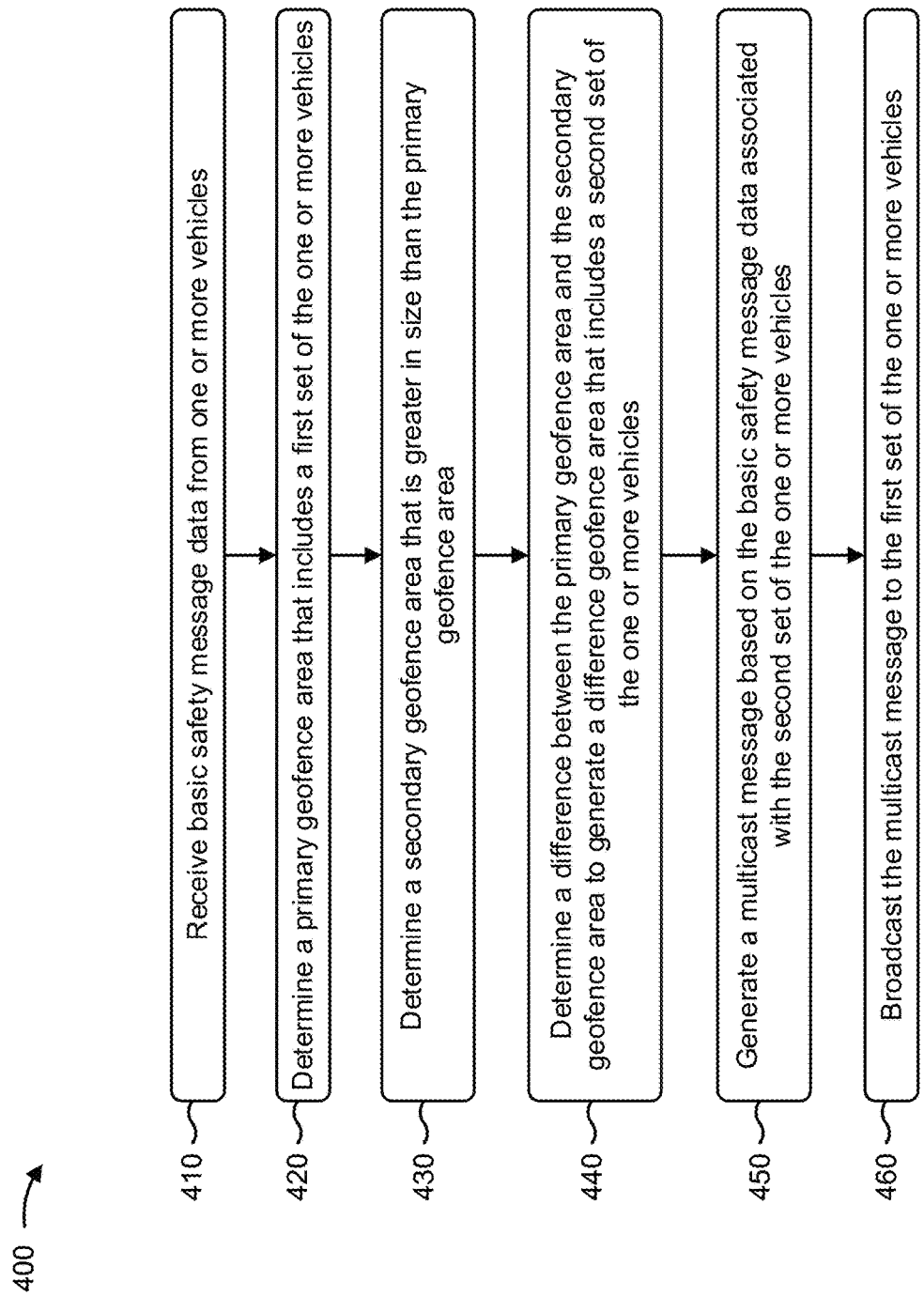

SYSTEMS AND METHODS FOR UTILIZING GEOFENCE AREAS AND MULTICASTING TO SHARE BASIC SAFETY MESSAGE DATA WITH VEHICLES

RELATED APPLICATION

This application is a continuation of U.S. patent application Ser. No. 16/704,728, entitled "SYSTEMS AND METHODS FOR UTILIZING GEOFENCE AREAS AND MULTICASTING TO SHARE BASIC SAFETY MESSAGE DATA WITH VEHICLES," filed Dec. 5, 2019 (now U.S. Pat. No. 10,848,907), which is incorporated herein by reference.

BACKGROUND

Networks, such as a fourth generation (4G) network and a fifth generation (5G) network, provide communication between vehicles and are an important aspect of deploying cellular vehicle-to-everything (C-V2X). C-V2X communication is the passing of information from a vehicle to any entity that may affect the vehicle, and vice versa. A C-2VX system incorporates other types of communication, such as vehicle-to-infrastructure (V2I), vehicle-to-network (V2N), vehicle-to-vehicle (V2V), vehicle-to-pedestrian (V2P), vehicle-to-device (V2D), vehicle-to-grid (V2G), and/or the like.

BRIEF DESCRIPTION OF THE DRAWINGS

FIG. 4 is a flow chart of an example process for utilizing geofence areas and multicasting to share basic safety message (BSM) data with vehicles.

DETAILED DESCRIPTION OF PREFERRED EMBODIMENTS

The following detailed description of example implementations refers to the accompanying drawings. The same reference numbers in different drawings may identify the same or similar elements.

Vehicle safety applications center on basic safety message (BSM) data that includes information about vehicle position, heading, speed, and other information relating to a vehicle's state and predicted path. BSM data is shared among neighboring vehicles via unicast messages. However, scheduling unicast messages from a vehicle to each neighboring vehicle requires significant band width and network resources. For example, for a group of N neighboring vehicles, a total of N(N−1) unicast messages need to be transmitted, which requires significant bandwidth (e.g., $O(N^2)$). Thus, current techniques for sharing BSM data waste computing resources (e.g., processing resources, memory resources, communication resources, and/or the like), networking resources, and/or the like associated with transmitting the unicast messages, scheduling the unicast messages, and/or the like.

Some implementations described herein provide a vehicle platform that utilizes geofence areas and multicasting to share BSM data with vehicles. For example, the vehicle platform may receive BSM data from one or more vehicles, and may determine, based on a quantity of the one or more vehicles and speed data identified in the BSM data, a primary geofence area that includes a first set of the one or more vehicles. The vehicle platform may determine a secondary geofence area based on the speed data and the quantity of the one or more vehicles, wherein the secondary geofence area may be greater in size than the primary geofence area. The vehicle platform may determine a difference between the primary geofence area and the secondary geofence area to generate a difference geofence area that includes a second set of the one or more vehicles, wherein the first set of the one or more vehicles is different than the second set of the one or more vehicles. The vehicle platform may generate a multicast message based on the BSM data associated with the second set of the one or more vehicles, and may broadcast the multicast message to the first set of the one or more vehicles.

In this way, the vehicle platform utilizes geofence areas and multicasting to share BSM data with vehicles. By transmitting the BSM data via multicast, and based on geofence areas that capture additional neighboring vehicles, the vehicle platform may significantly reduce bandwidth requirements for sharing the BSM data. Thus, the vehicle platform conserves computing resources (e.g., processing resources, memory resources, communication resources, and/or the like), networking resources, and/or the like that would otherwise be wasted in transmitting the unicast messages, scheduling the unicast messages, and/or the like.

Figure 1A:
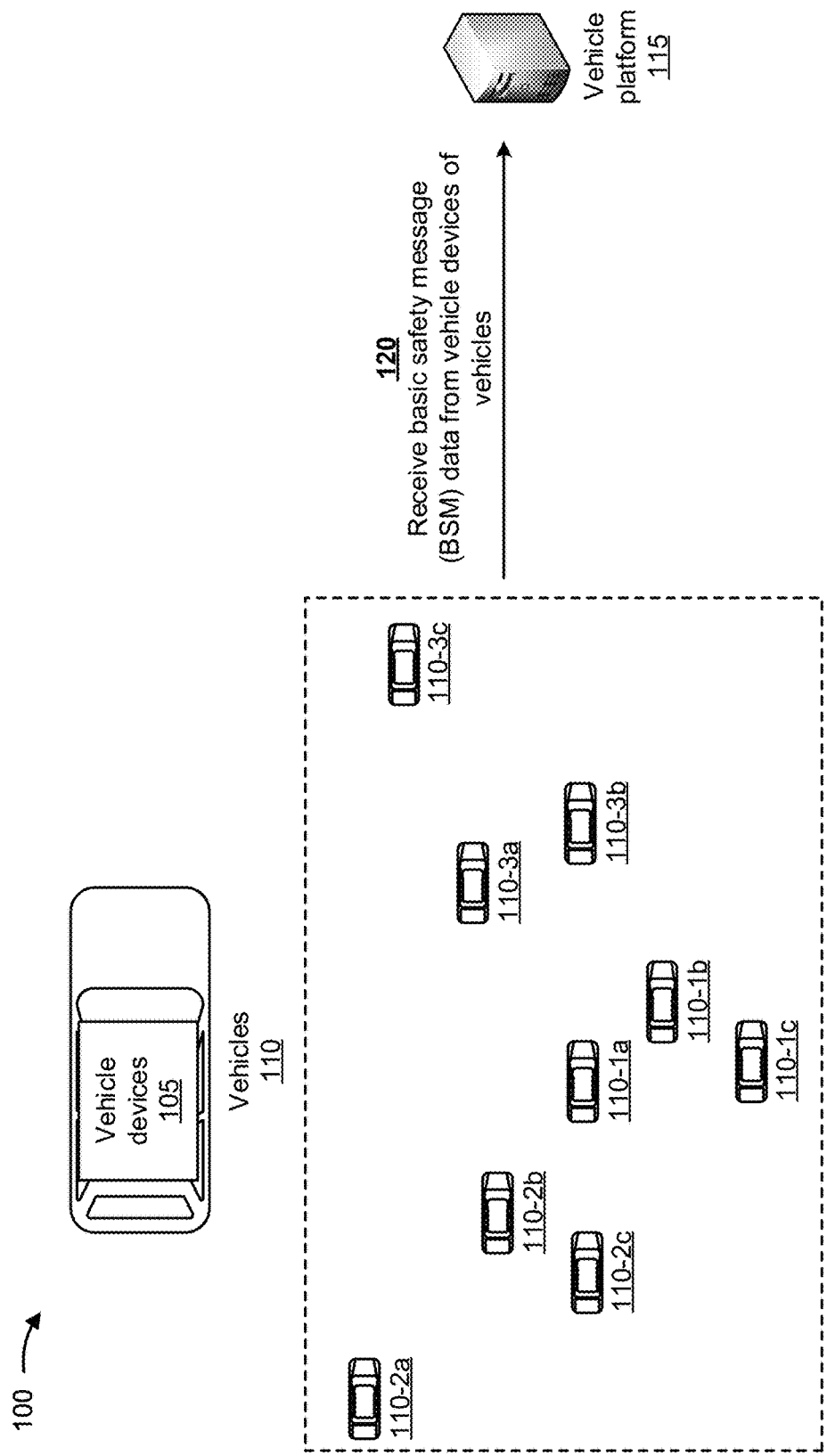
FIGS. 1A-1O are diagrams of one or more example implementations described herein.

FIGS. 1A-1O are diagrams of one or more example implementations 100 described herein. As shown in FIG. 1A, vehicle devices 105 may be associated with vehicles 110 and a vehicle platform 115 that are geographically dispersed. In some implementations, vehicle devices 105 may include devices (e.g., on-board diagnostic (OBD) devices, electronic control units (ECUs), and/or the like) that receive vehicle data (e.g., engine on condition, engine off condition, data indicating acceleration, speed, movement, and/or the like) and control other vehicle devices, vehicle sensors that capture the vehicle data, devices (e.g., dash cameras, parking assist cameras, backup assist cameras, and/or the like) that capture images or video, vehicle infotainment systems, vehicle navigation systems, mobile devices (e.g., smart phones), and/or the like associated with vehicles 110. Vehicle platform 115 may include a platform that utilizes geofence areas and multicasting to share BSM data with vehicles 110 (e.g., via vehicle devices 105).

As further shown in FIG. 1A, and by reference number 120, vehicle platform 115 may receive basic safety message (BSM) data from vehicle devices 105 of vehicles 110. In some implementations, the BSM data may include data identifying sizes of vehicles 110, positions (e.g., global positioning system (GPS) coordinates) of vehicles 110, speeds of vehicles 110, headings of vehicles 110, accelerations of vehicles 110, statuses of brake systems of vehicles 110, headings of vehicles 110, predicted paths of vehicles 110, other state information associated with vehicles 110, and/or the like.

In some implementations, vehicle platform 115 may continuously receive the BSM data, may periodically receive the BSM data (e.g., in seconds, minutes, hours, and/or the like), may receive the BSM data based on requests for the BSM data, and/or the like. In some implementations, the vehicle platform may store the BSM data in a data structure (e.g., a database, a table, a list, and/or the like) associated with the vehicle platform.

Figure 1B:
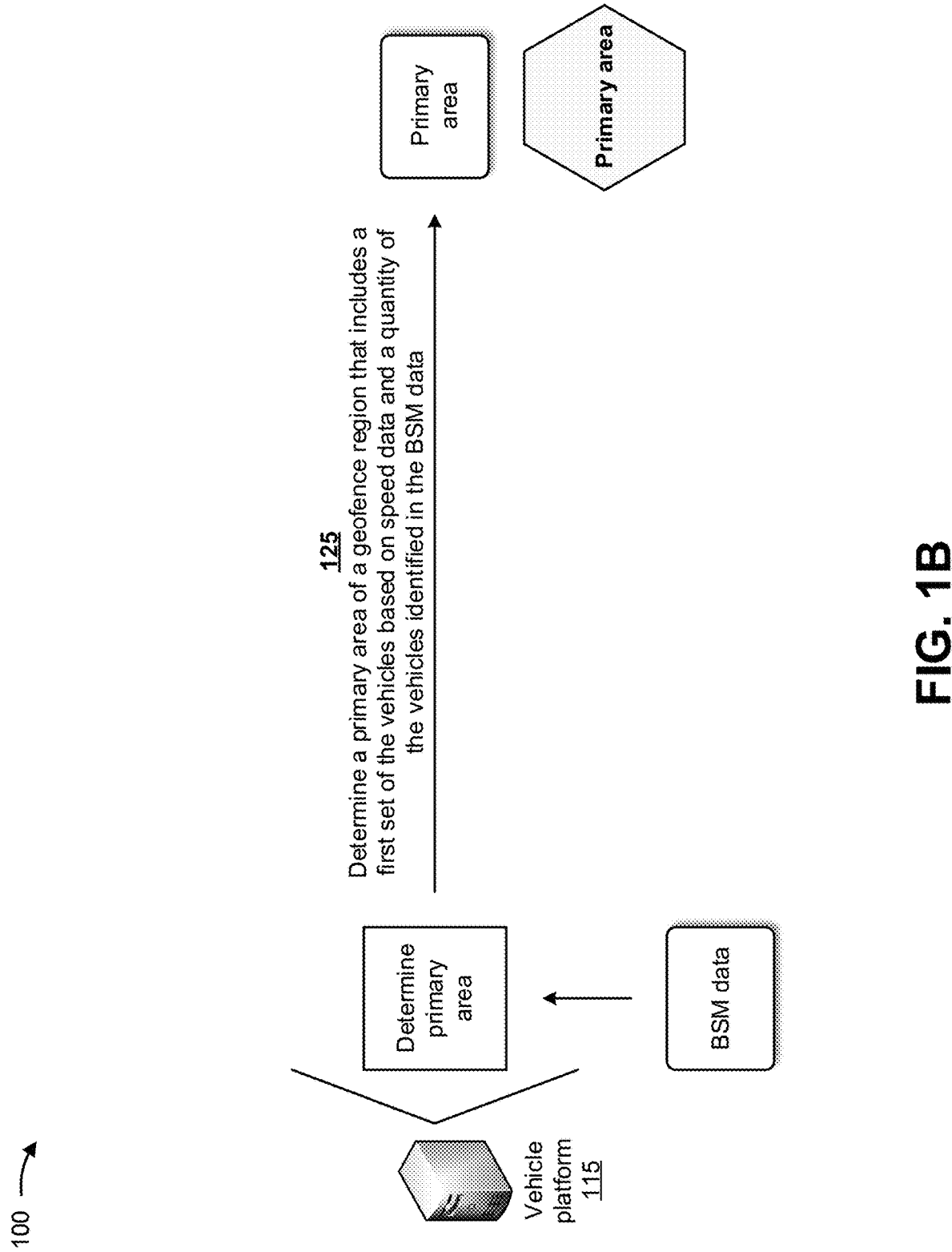

As shown in FIG. 1B, and by reference number 125, vehicle platform 115 may determine a primary area of a geofence region (e.g., a primary geofence area) that includes a first set of vehicles 110 based on speed data and a quantity of vehicles 110 identified in the BSM data. Although implementations described herein show geofence areas with hexagonal shapes, in some implementations, one or more of the geofence areas may include a regular shape (e.g., a square, a circle, a triangle, a polygon, and/or the like), an irregular shape, and/or the like. In some implementations, a geofence area may be defined so that data (e.g., BSM data) about neighboring vehicles to a vehicle within the geofence area may be provided to the vehicle. In this way, the vehicle may maneuver safely and the neighboring vehicles may also maneuver safely.

In some implementations, sizes of the geofence areas described herein may vary based on speeds of vehicles 110 traveling in the geofence areas. For example, if speeds of vehicles 110 traveling in the primary geofence area or speed limits in the primary geofence area are less than a threshold speed (e.g., ten kilometer per hour (kph), twenty kph, thirty kph, and/or the like), the primary geofence area may be made smaller since more vehicles 110 may remain in the primary geofence area longer. Conversely, if speeds of vehicles 110 traveling in the primary geofence area or speed limits in the primary geofence area are greater than or equal to the threshold speed, the primary geofence area may be made larger to ensure that more vehicles 110 remain in the primary geofence area longer.

In some implementations, the quantity of vehicles 110 may determine a size of the primary geofence area. For example, the quantity of vehicles 110 in densely populated urban areas may be large, and the size of the primary geofence area may be made smaller since more vehicles 110 may remain in the primary geofence area longer. In contrast, the quantity of vehicles 110 in rural areas may be small, and the size of the primary geofence area may be made larger to ensure that more vehicles 110 remain in the primary geofence area longer.

In some implementations, vehicle platform 115 may determine a size and/or a shape of the primary geofence area to ensure that vehicles 110 may react to neighboring vehicles 110. Vehicle platform 115 may utilize the primary geofence area as a broadcast region for broadcasting multicast messages to neighboring vehicles not included in the primary geofence area. For example, the first set of vehicles 110 included in the primary geofence area may be defined as a multicast group for broadcasting the multicast messages to neighboring vehicles not included in the primary geofence area.

Figure 1C:
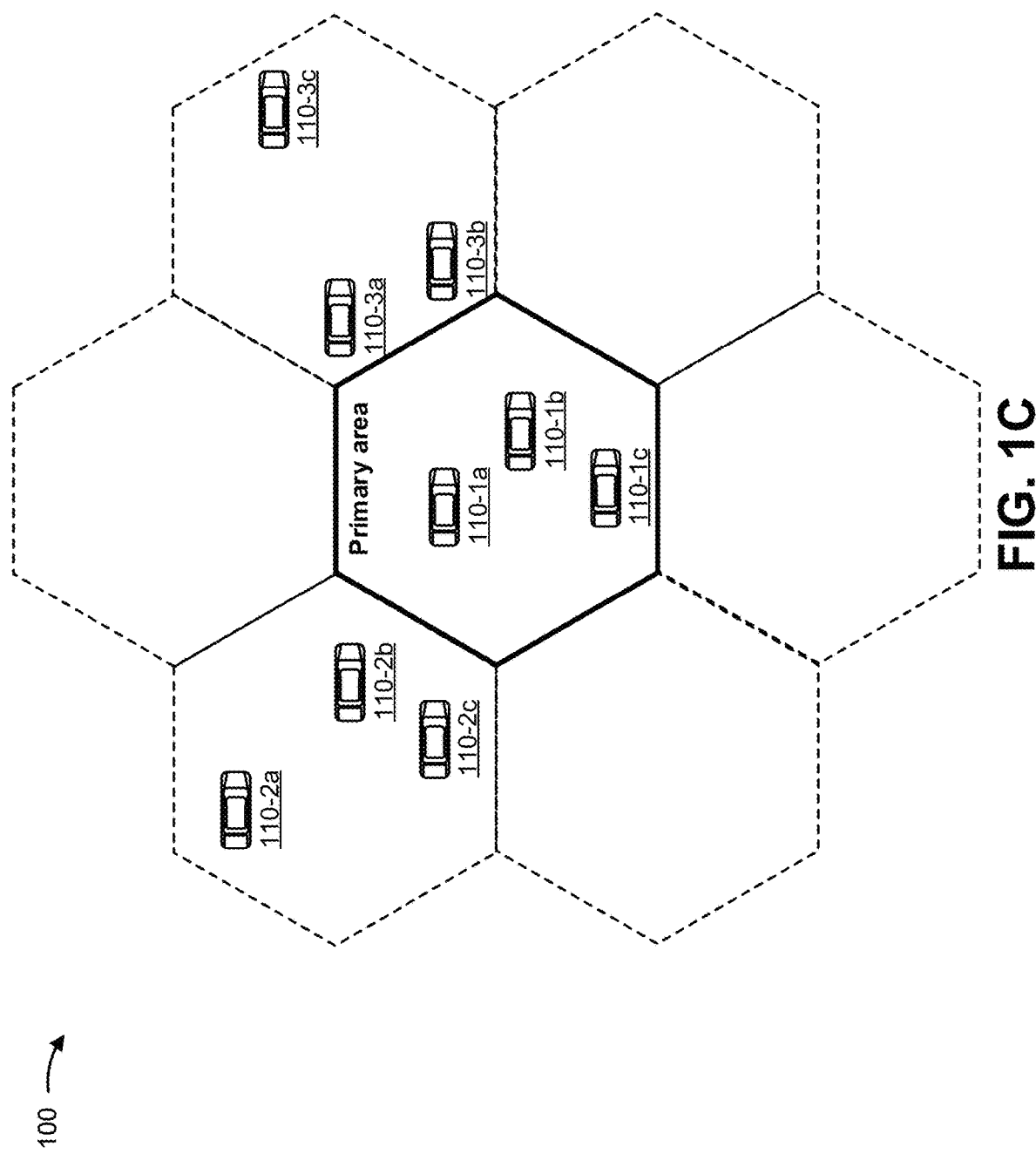

As shown in FIG. 1C, the primary geofence area (e.g., labeled as primary area) may include the first set of vehicles 110 (e.g., vehicle 110-1a, vehicle 110-1b, and vehicle 110-1c). The primary geofence area may include or be adjacent to multiple geofence areas. In some implementations, each of the multiple geofence areas (e.g., shown by dashed lines) may include a same size and shape as the primary geofence area, different sizes than the primary geofence area, different shapes than the primary geofence area, and/or the like. By way of example and as shown in FIG. 1C, a first geofence area may include three vehicles 110 (e.g., vehicle 110-2a, vehicle 110-2b, and vehicle 110-2c), a second geofence area may include three vehicles 110 (e.g., vehicle 110-3a, vehicle 110-3b, and vehicle 110-3c), and the remaining geofence areas may not include any vehicles 110.

Figure 1D:
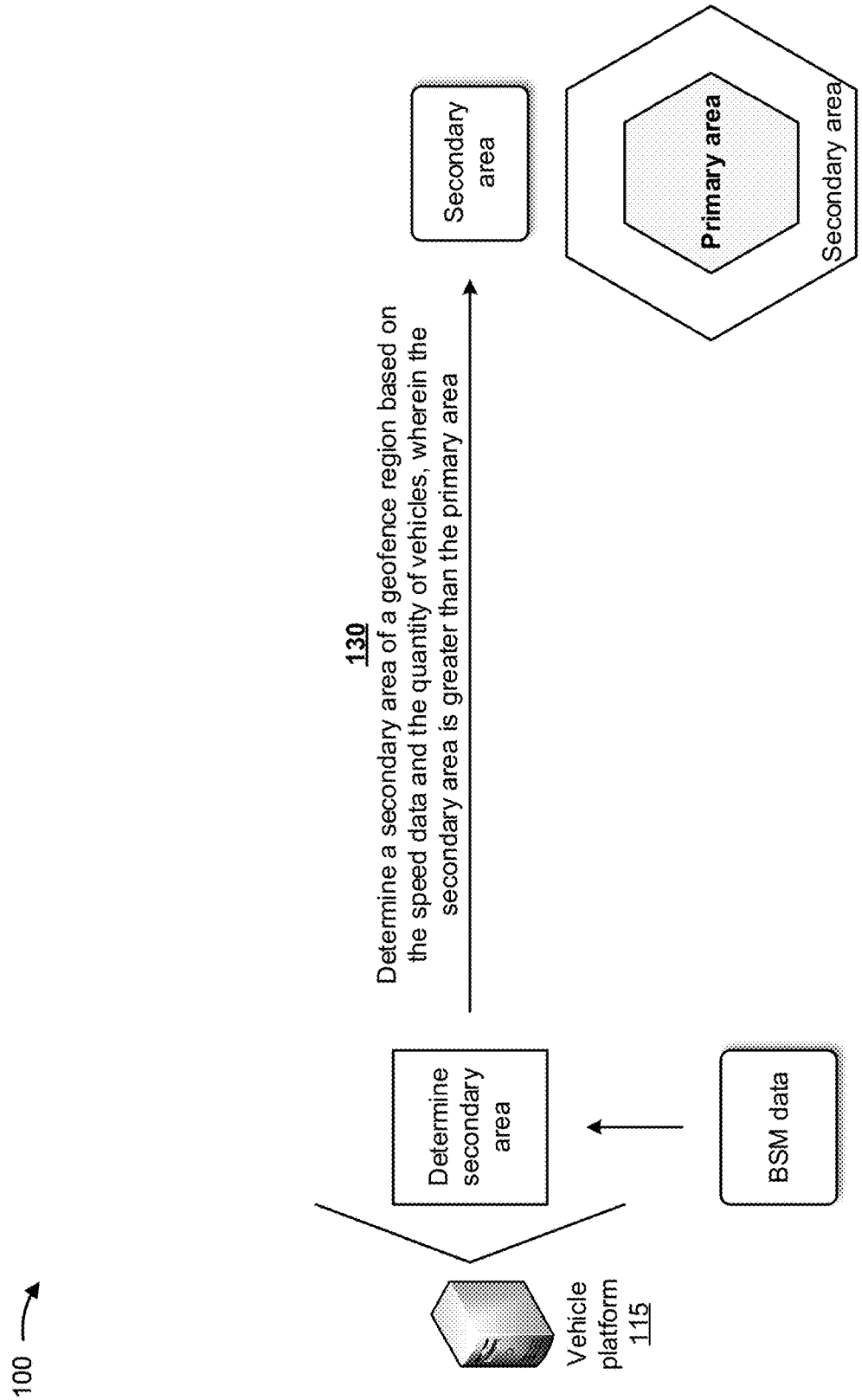

As shown in FIG. 1D, and by reference number 130, vehicle platform 115 may determine a secondary area of a geofence region (e.g., a second geofence area) based on the speed data and the quantity of vehicles 110. In some implementations, the secondary geofence area may be greater in size than the primary geofence area. In some implementations, a size of the secondary geofence area may vary based on speeds of vehicles 110 traveling in the secondary geofence area. For example, if speeds of vehicles 110 traveling in the secondary geofence area or speed limits in the secondary geofence area are less than the threshold speed, the secondary geofence area may be made smaller since more vehicles 110 may remain in the secondary geofence area longer. Conversely, if speeds of vehicles 110 traveling in the secondary geofence area or speed limits in the secondary geofence area are greater than or equal to the threshold speed, the secondary geofence area may be made larger to ensure that more vehicles 110 remain in the secondary geofence area longer.

In some implementations, the quantity of vehicles 110 may determine a size of the secondary geofence area. For example, the quantity of vehicles 110 in densely populated urban areas may be large, and the size of the secondary geofence area may be made smaller since more vehicles 110 may remain in the secondary geofence area longer. In contrast, the quantity of vehicles 110 in rural areas may be small, and the size of the secondary geofence area may be made larger to ensure that more vehicles 110 remain in the secondary geofence area longer. In some implementations, vehicle platform 115 may determine a size and/or a shape of the secondary geofence area to ensure that vehicles 110 may react to neighboring vehicles 110.

In some implementations, the secondary geofence area may share a center point with the primary geofence area (e.g., may be centered on the primary geofence area, as shown in FIG. 1D), and may overlap with one or more other secondary geofence areas. In some implementations, the secondary geofence area may be larger in size (e.g., about 25-50% larger in size) in order to capture vehicles 110 that are neighbors with the first set of vehicles 110 included in the primary geofence area. The secondary geofence area may be larger in size than the primary geofence area so that vehicles 110 within the primary geofence area may receive enough BSM data (e.g., from neighboring vehicles 110) for safe maneuvering.

Figure 1E:
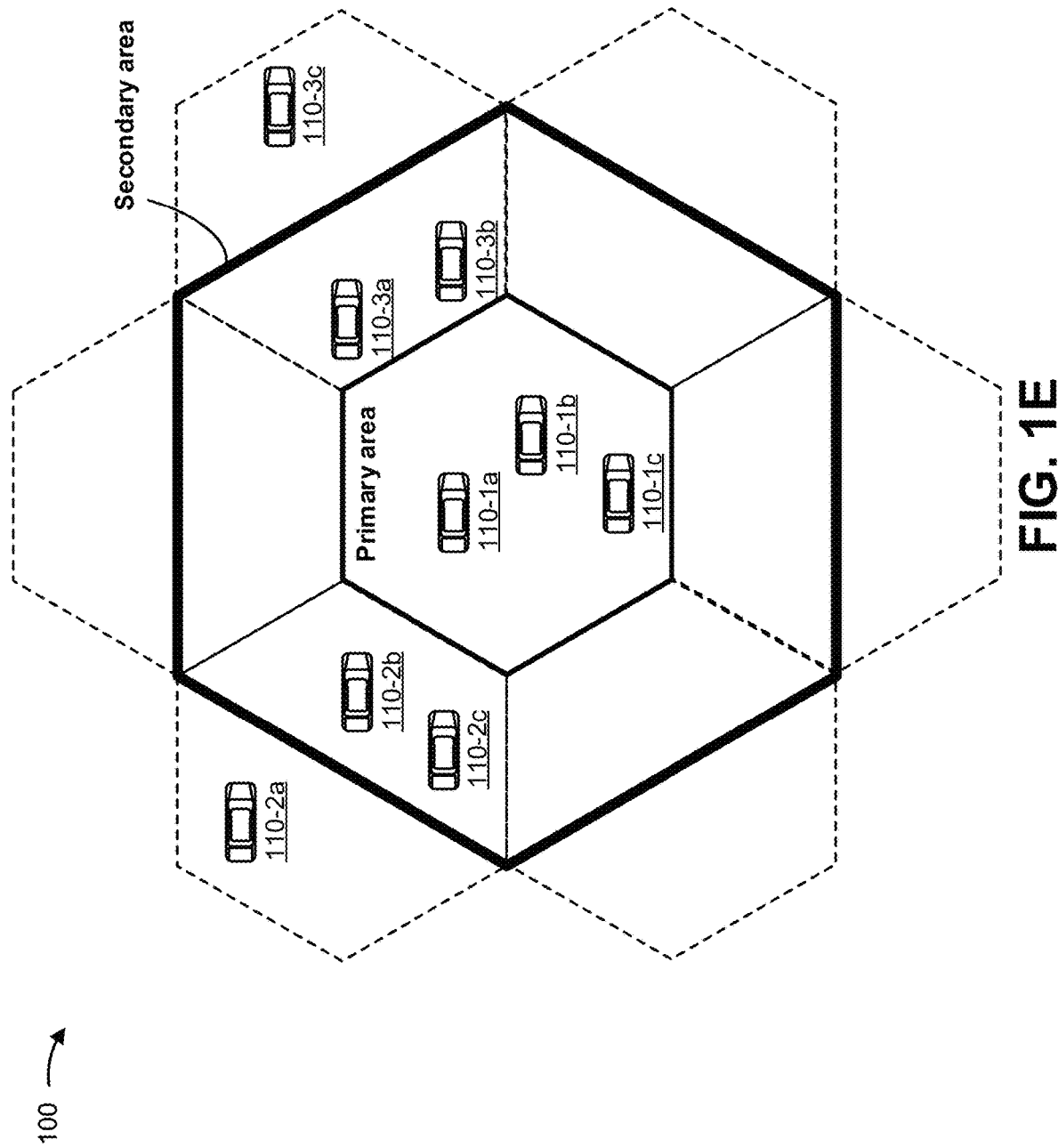

As shown in FIG. 1E, the secondary geofence area (e.g., labeled as secondary area) may include the first set of vehicles 110 (e.g., vehicle 110-1a, vehicle 110-1b, and vehicle 110-1c) of the primary geofence area, two vehicles 110 (e.g., vehicle 110-2b and vehicle 110-2c) of a geofence area that is adjacent to the primary geofence area, and two vehicles 110 (e.g., vehicle 110-3a and vehicle 110-3b) of another geofence area that is adjacent to the primary geofence area. As further shown, vehicle 110-2a and vehicle 110-3c may not be included in the secondary geofence area.

As shown in FIG. 1F, and by reference number 135, vehicle platform 115 may determine a difference between the primary geofence area and the secondary geofence area to generate a difference geofence area that includes a second set of vehicles 110. In some implementations, vehicle platform 115 may subtract the primary geofence area from the secondary geofence area to generate the difference geofence area. In some implementations, the first set of vehicles 110 (e.g., included in the primary geofence area) may be different that the second set of vehicles 110 (e.g., included in the difference geofence area).

Figure 1G:
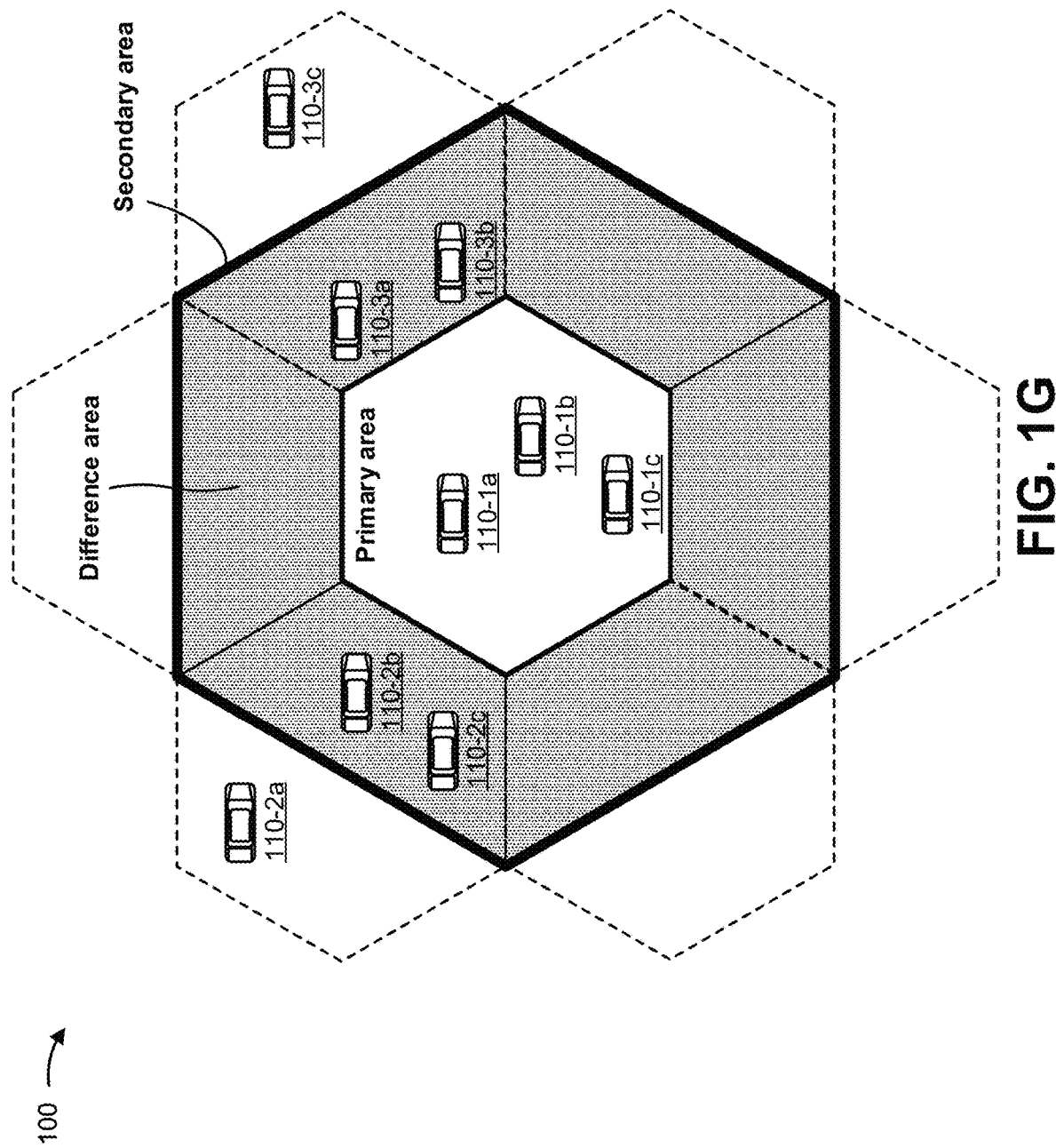

As shown in FIG. 1G, the difference geofence area (e.g., labeled as difference area) may include a geofence area (the shaded area in FIG. 1G) that includes the two vehicles 110

(e.g., vehicle 110-2*b* and vehicle 110-2*c*) of the geofence area that is adjacent to the primary geofence area, and the two vehicles 110 (e.g., vehicle 110-3*a* and vehicle 110-3*b*) of the other geofence area that is adjacent to the primary geofence area. As further shown, vehicle 110-2*a* and vehicle 110-3*c* may not be included in the difference geofence area.

As shown in FIG. 1H, and by reference number 140, vehicle platform 115 may generate a multicast message based on the BSM data associated with the second set of vehicles 110 (e.g., vehicle 110-2*b*, vehicle 110-2*c*, vehicle 110-3*a*, and vehicle 110-3*b*). In some implementations, vehicle platform 115 may collect BSM data associated with the second set of vehicles 110, and may include the collected BSM data in the multicast message. In some implementations, vehicle platform 115 may generate another multicast message based on BSM data associated with the first set of vehicles 110. For example, vehicle platform 115 may collect BSM data associated with the first set of vehicles 110, and may include the collected BSM data in the other multicast message.

Figure 1I:
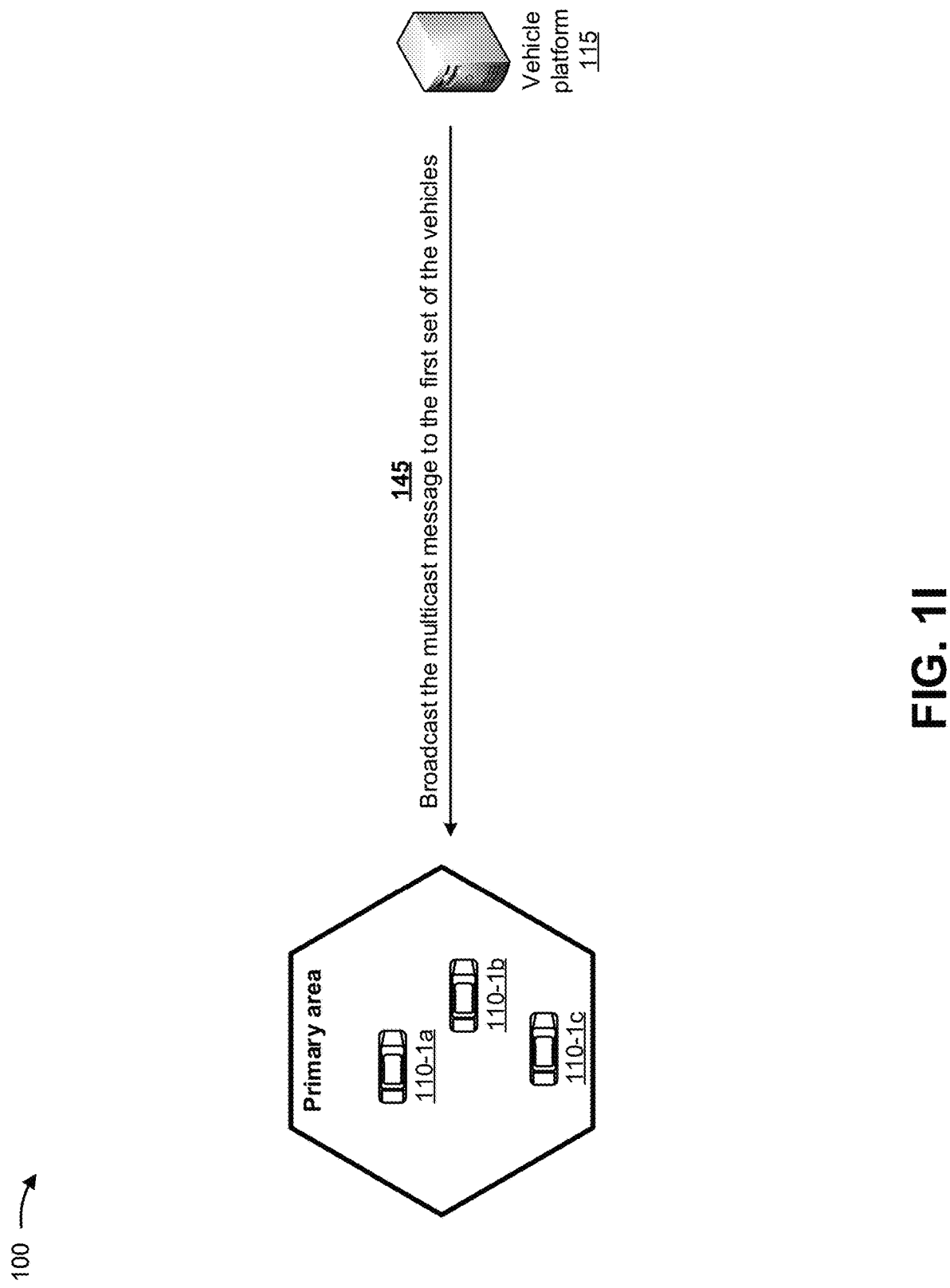

As shown in FIG. 1I, and by reference number 145, vehicle platform 115 may broadcast the multicast message to the first set of vehicles 110. In some implementations, vehicle platform 115 may broadcast the other multicast message to the second set of vehicles 110. In this way, the neighboring vehicles 110 (e.g., in the first set and the second set) may efficiently exchange BSM data via multicasting (e.g., rather than via unicasting). In some implementations, vehicles devices 105 and/or vehicles 110 may utilize the multicast messages to prevent vehicle accidents, to maneuver to avoid vehicle accidents, to discern locations of other vehicles 110, and/or the like.

In one example, a quantity of multicast messages broadcast for the primary geofence area may be determined by: N1*R+ΔR, where N1 may correspond to an average quantity of vehicles 110 per geofence, R may correspond to a quantity of multicast messages per second per vehicle 110, and Δ may correspond to a difference between the quantity of vehicles 110 included in the secondary geofence area and the quantity of vehicles included in the primary geofence area (e.g., Δ may be 30% to 50% depending on local speeds of the primary geofence area and the secondary geofence area). In this example, each vehicle 110 may receive N+Δ multicast messages, and may need to detect its own BSM data and potentially redundant multicast messages. In another example, a quantity of multicast messages broadcast in a market (e.g., more than the primary geofence area) may be determined by: (N1+Δ)*G1*R, where G1 may correspond a quantity geofence areas adjacent to and including the primary geofence area.

In this way, vehicle platform 115 may provide hierarchical, multi-scale geofences that provide a more comprehensive list of neighbor vehicles 110 for every vehicle 110. This may reduce downlink messages significantly, keeping the number of downlink messages at, for example, O(N), and may permit flexibility to adjust network (e.g., over-the-air) utilization based on regional needs. An average downlink may not exceed a particular value (e.g., 4NGR) and may decrease to a smaller value (e.g., 2NGR, depending on a size of the secondary geofence are), which provide substantial savings of over-the-air bandwidth.

Figure 1J:
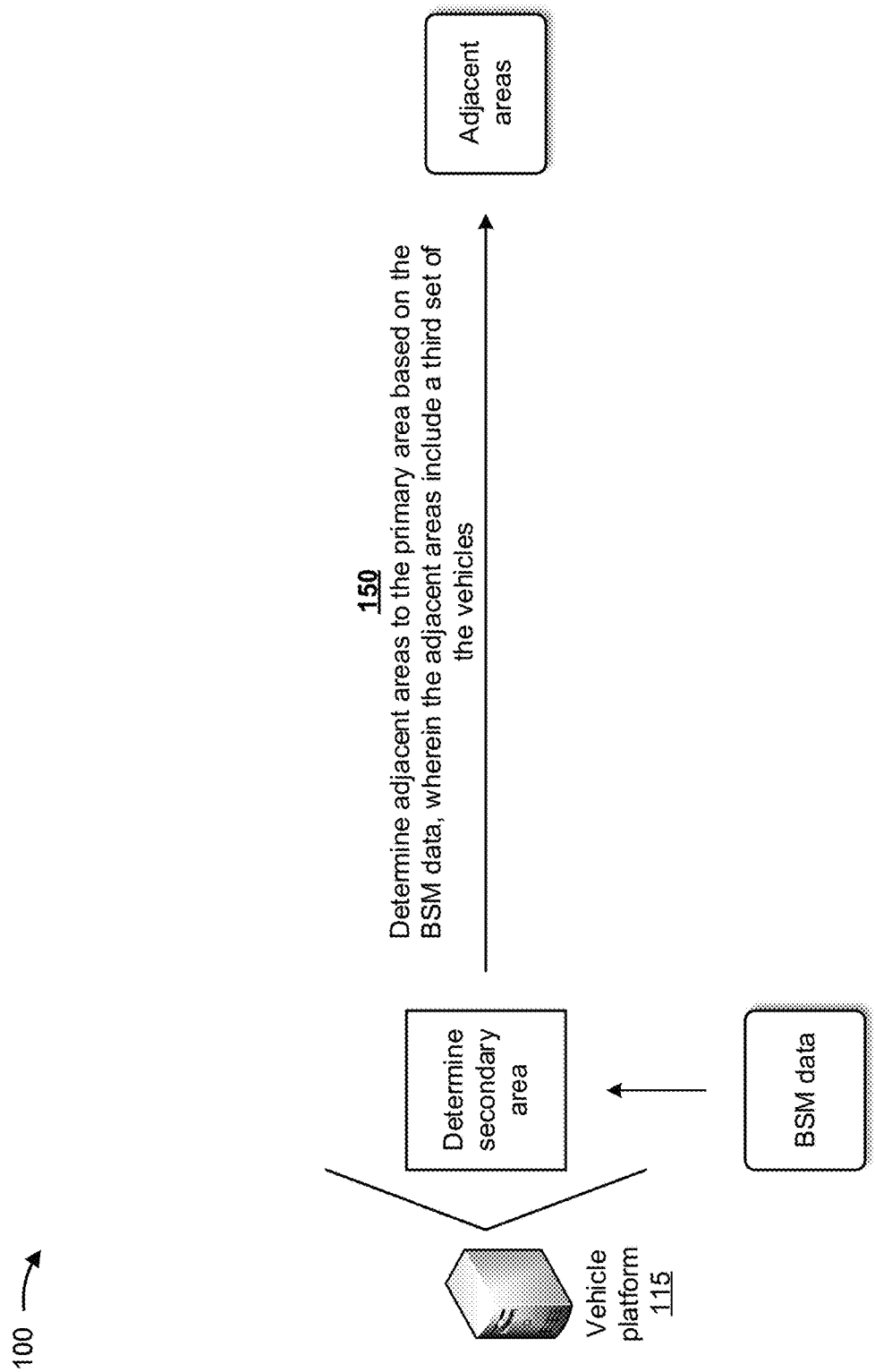

As shown in FIG. 1J, and by reference number 150, in some implementations, vehicle platform 115 may determine adjacent geofence areas to the primary geofence area based on the BSM data. In some implementations, the adjacent geofence areas may include a third set of vehicles 110 that is different than the first set of vehicles 110. In some implementations, the adjacent geofence areas may be determined to enable the first set of vehicles 110 (e.g., included in the primary geofence area) to identify neighboring vehicles 110 located a particular distance from the first set of vehicles 110.

Figure 1K:
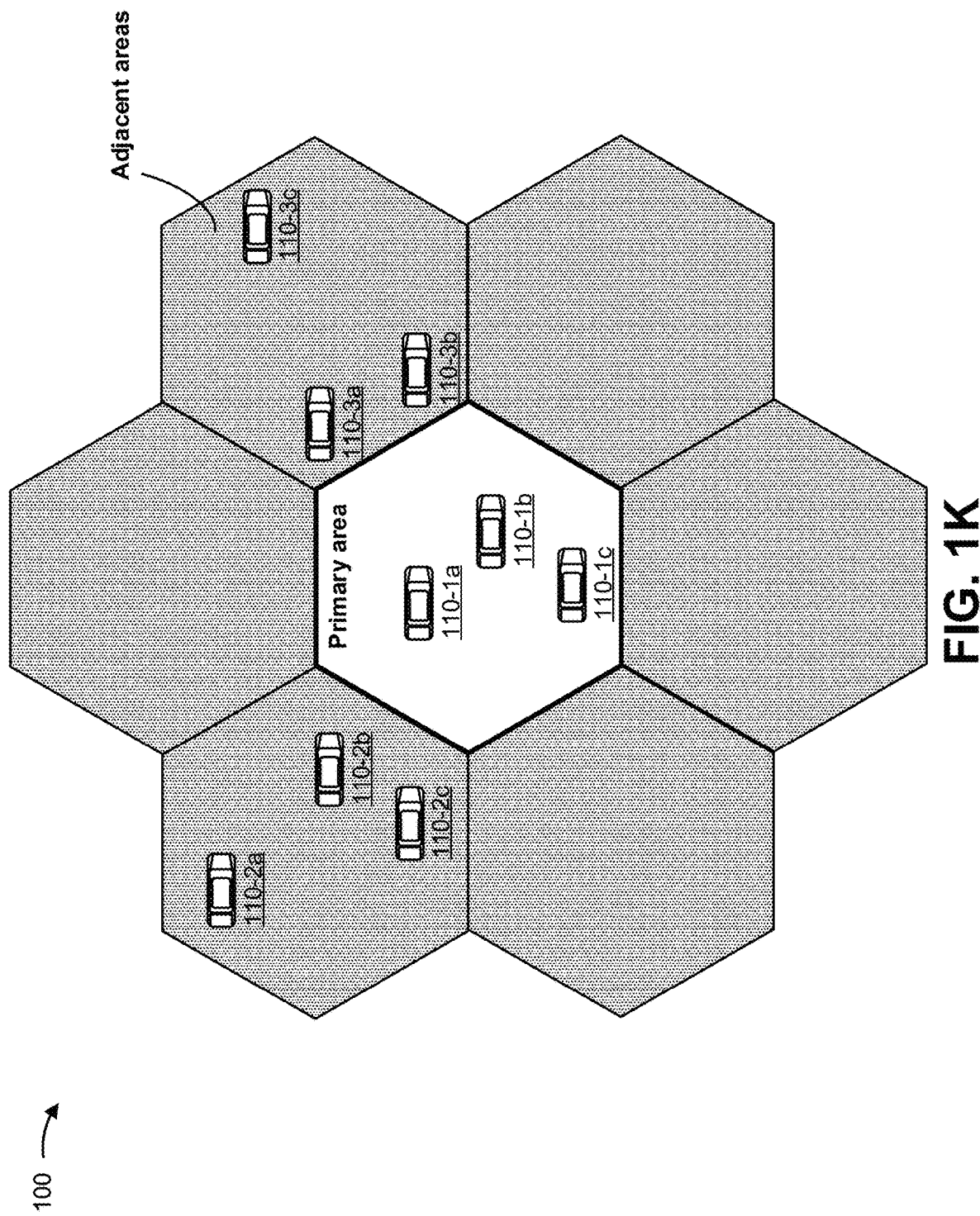

For example, as shown in FIG. 1K, the adjacent geofence areas (e.g., the shaded areas in FIG. 1K that are labeled as adjacent areas) may include all geofence areas that abut and/or contact the primary geofence area, such as the six geofence areas surrounding the primary geofence area. As further shown, adjacent geofence areas may include three vehicles 110 (e.g., vehicle 110-2*a*, vehicle 110-2*b*, and vehicle 110-2*c*) of a geofence area that is adjacent to the primary geofence area, and three vehicles 110 (e.g., vehicle 110-3*a*, vehicle 110-3*b*, and vehicle 110-3*c*) of another geofence area that is adjacent to the primary geofence area.

Figure 1L:
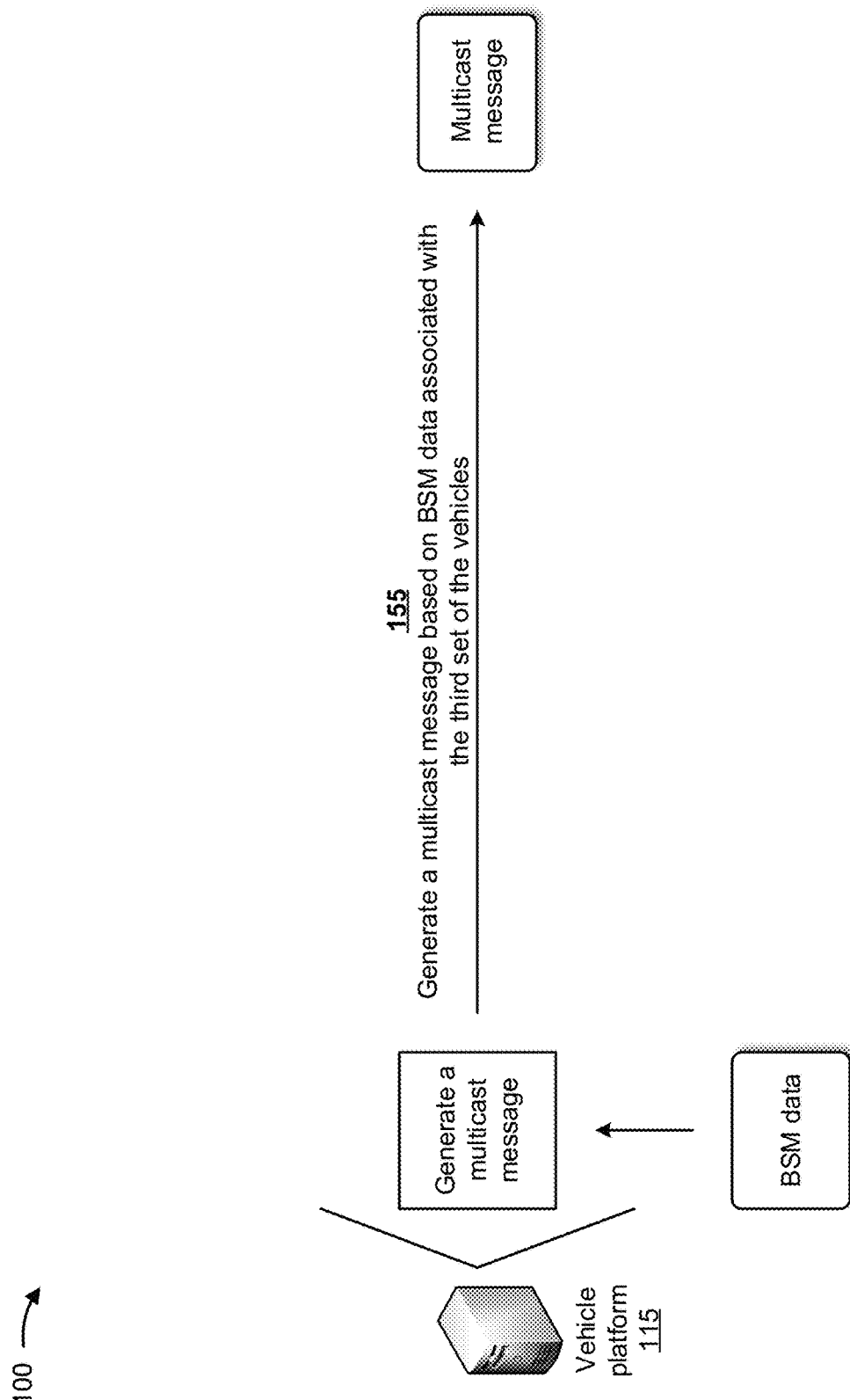

As shown in FIG. 1L, and by reference number 155, vehicle platform 115 may generate a multicast message based on BSM data associated with the third set of vehicles 110 (e.g., vehicle 110-2*a*, vehicle 110-2*b*, vehicle 110-2*c*, vehicle 110-3*a*, vehicle 110-3*b*, and vehicle 110-3*c*). In some implementations, vehicle platform 115 may collect BSM data associated with the third set of vehicles 110, and may include the collected BSM data in the multicast message. In some implementations, vehicle platform 115 may generate another multicast message based on BSM data associated with the first set of vehicles 110. For example, vehicle platform 115 may collect BSM data associated with the first set of vehicles 110, and may include the collected BSM data in the other multicast message. In some implementations, vehicle platform 115 may broadcast the multicast message to the first set of vehicles 110, and may broadcast the other multicast message to the third set of vehicles 110. In this way, vehicle platform 115 may provide an easy to implement mechanism to identify neighboring vehicles 110.

In one example, the adjacent geofence areas may enable a quantity (e.g., 7*N1) of multicast messages from vehicles 110 in the primary geofence area and neighboring vehicles 110 in the adjacent geofence areas. A quantity of multicast messages for vehicles 110 in the primary geofence area may be 7*N1*R, and a quantity of multicast messages for vehicles 110 in the adjacent geofence areas may be 7*N1*G1*R, where N1 may correspond to an average quantity of vehicles 110 per geofence area, R may correspond to a quantity of multicast messages per second per vehicle 110, and G1 may correspond to a quantity of geofence areas.

Figure 1M:
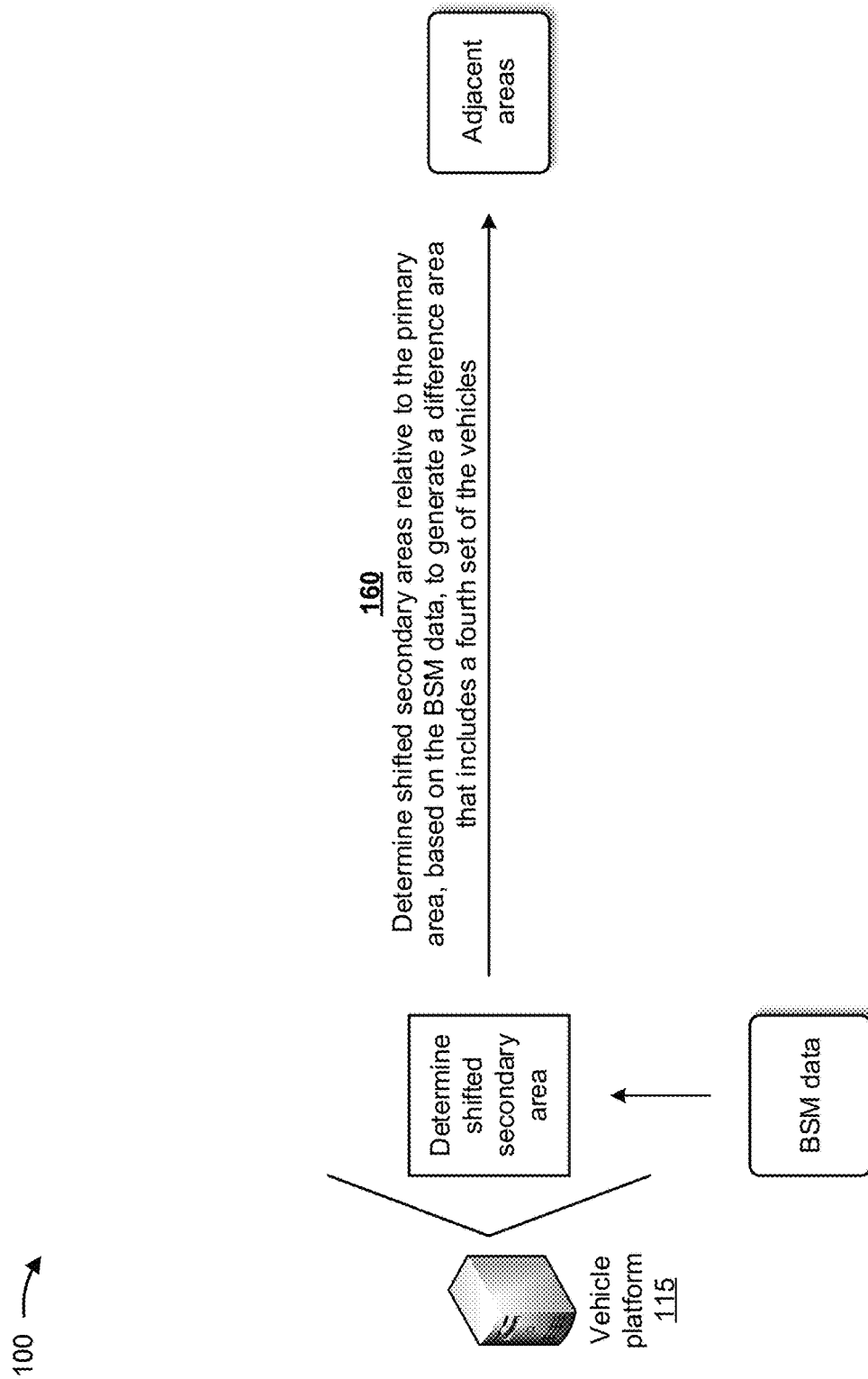

As shown in FIG. 1M, and by reference number 160, vehicle platform 115 may determine shifted secondary geofence areas relative to the primary geofence area, based on the BSM data, to generate a difference geofence area that includes a fourth set of vehicles 110. In some implementations, the fourth set of vehicles 110 may be different than the first set of vehicles 110.

In some implementations, the shifted secondary geofence areas may be greater in size than the primary geofence area. In some implementations, the sizes of the shifted secondary geofence areas may vary based on speeds of vehicles 110 traveling in the shifted secondary geofence areas. For example, if speeds of vehicles 110 traveling in the shifted secondary geofence areas or speed limits in the shifted secondary geofence areas are less than the threshold speed, the shifted secondary geofence areas may be made smaller since more vehicles 110 may remain in the shifted secondary geofence areas longer. Conversely, if speeds of vehicles 110 traveling in the shifted secondary geofence areas or speed limits in the shifted secondary geofence areas are greater than or equal to the threshold speed, the shifted secondary geofence areas may be made larger to ensure that more vehicles 110 remain in the shifted secondary geofence areas longer.

In some implementations, the quantity of vehicles 110 may determine the sizes of the shifted secondary geofence areas. For example, the quantity of vehicles 110 in densely populated urban areas may be large, and the sizes of the shifted secondary geofence areas may be made smaller since more vehicles 110 may remain in the shifted secondary geofence areas longer. In contrast, the quantity of vehicles 110 in rural areas may be small, and the sizes of the shifted secondary geofence areas may be made larger to ensure that more vehicles 110 remain in the shifted secondary geofence areas longer. In some implementations, vehicle platform 115 may determine sizes and/or shapes of the shifted secondary geofence areas to ensure that vehicles 110 may react to neighboring vehicles 110.

In some implementations, a shifted secondary geofence area may be shifted at a particular angle (e.g., forty-five degrees, one-hundred and thirty-five degrees, two-hundred and twenty-five degrees, and/or the like) from a center point of the primary geofence area, and may overlap with one or more other shifted secondary geofence areas. In some implementations, the secondary geofence area may be larger in size (e.g., about 25-50% larger in size) in order to capture vehicles 110 that are neighbors with the first set of vehicles 110 included in the primary geofence area.

Figure 1N:
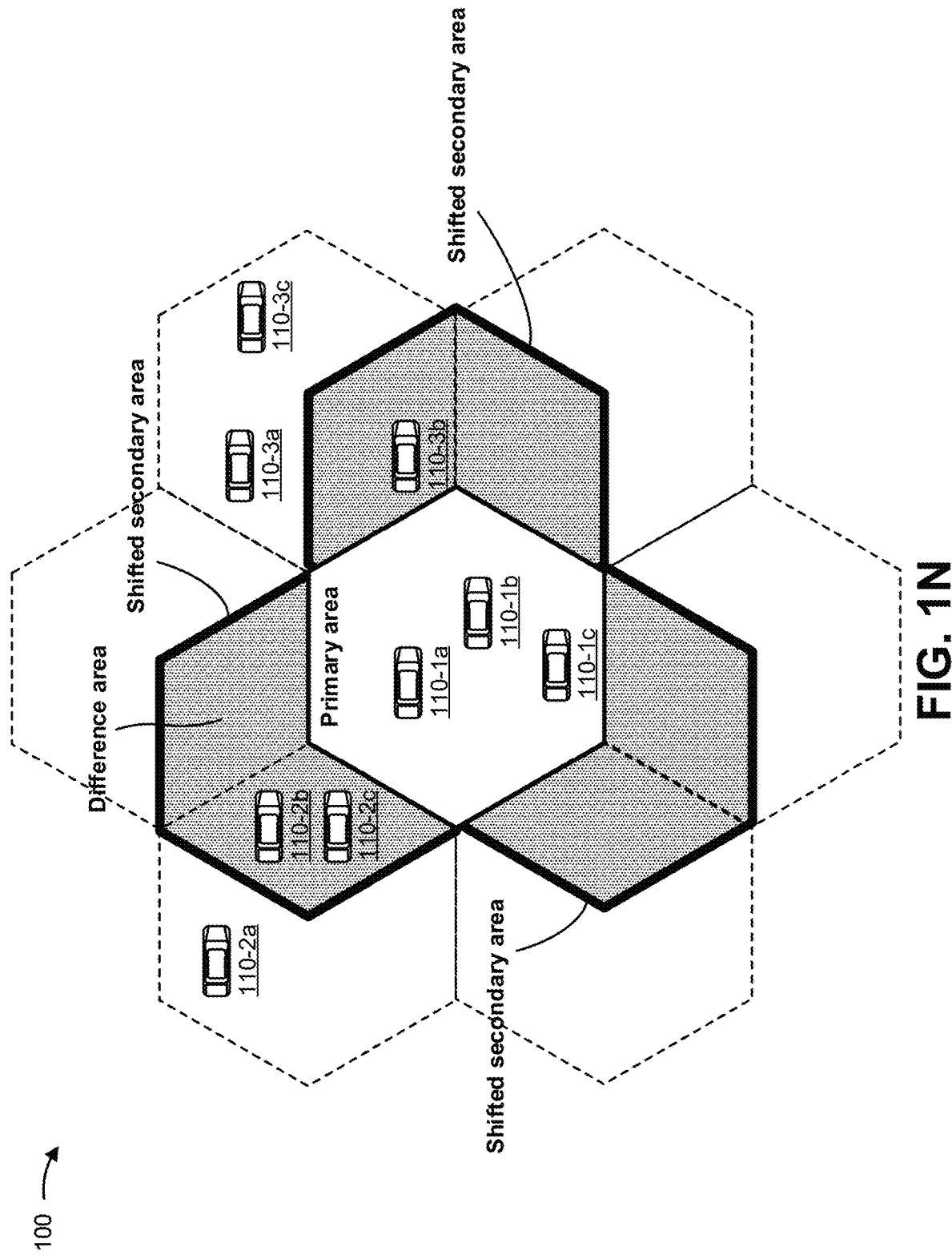
Figure 10:
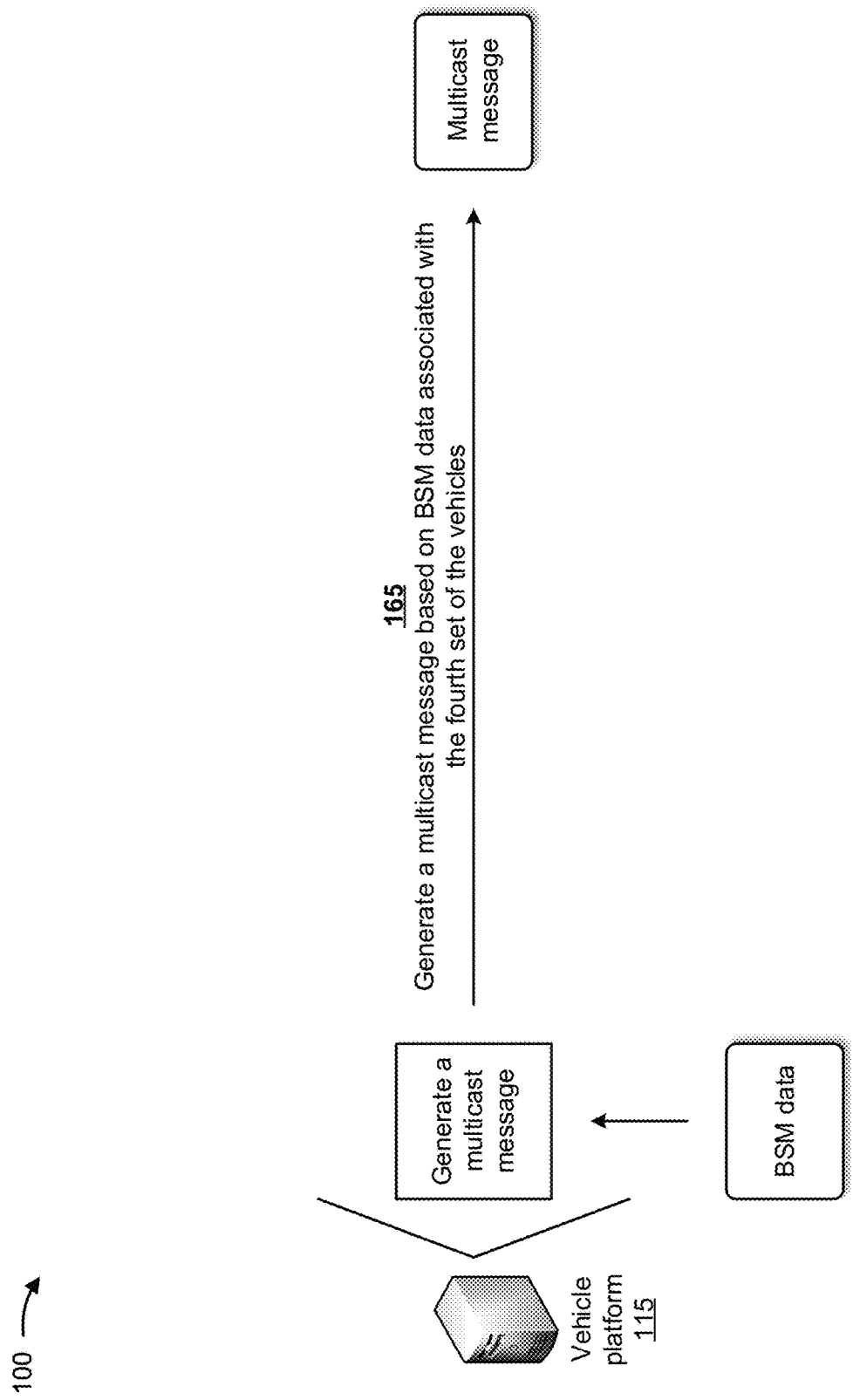

For example, as shown in FIG. 1N, multiple secondary geofence areas may be shifted relative to the primary geofence area (e.g., relative to a center point of the primary geofence area) to provide the shifted secondary geofence areas (e.g., labeled as shifted secondary areas). In some implementations, vehicle platform 115 may determine a difference between the primary geofence areas and the shifted secondary geofence areas to generate a difference geofence area (e.g., the shaded area in FIG. 1N that is labeled as difference area) that includes a fourth set of vehicles 110. In some implementations, vehicle platform 115 may subtract the primary geofence area from the shifted secondary geofence areas to generate the difference geofence area. In some implementations, the first set of vehicles 110 (e.g., included in the primary geofence area) may be different that the fourth set of vehicles 110 (e.g., included in the difference geofence area). As further shown in FIG. 1N, the difference geofence area may include three vehicles 110 (e.g., vehicle 110-2b, vehicle 110-2c, and vehicle 110-3b). In some implementations, the multiple secondary geofence areas may be shifted relative to the primary geofence area to provide additional shifted secondary geofence areas than depicted in FIG. 1N. In some implementations, some of the secondary geofence areas may be shifted relative to the primary geofence area and other secondary geofence areas may not be shifted relative to the primary geofence area.

As shown in FIG. 1O, and by reference number 165, vehicle platform 115 may generate a multicast message based on BSM data associated with the fourth set of vehicles 110 (e.g., vehicle 110-2b, vehicle 110-2c, and vehicle 110-3b). In some implementations, vehicle platform 115 may collect BSM data associated with the fourth set of vehicles 110, and may include the collected BSM data in the multicast message. In some implementations, vehicle platform 115 may generate another multicast message based on BSM data associated with the first set of vehicles 110. For example, vehicle platform 115 may collect BSM data associated with the first set of vehicles 110, and may include the collected BSM data in the other multicast message. In some implementations, vehicle platform 115 may broadcast the multicast message to the first set of vehicles 110, and may broadcast the other multicast message to the fourth set of vehicles 110. In this way, the neighboring vehicles 110 (e.g., in the first set and the second set) may efficiently exchange BSM data via multicasting (e.g., rather than via unicasting).

In one example, the shifted secondary geofence areas may enable a quantity of multicast messages of $(6/2+1)*N3*G3*R$, where N3 may correspond to an average quantity of vehicles 110 in the shifted secondary geofence areas, R may correspond to a quantity of multicast messages per second per vehicle 110, and G3 may correspond to a quantity of shifted secondary geofence areas.

In this way, several different stages of the process for sharing BSM data with vehicles are automated via geofence areas and multicasting, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed based on subjective human intuition or input. For example, currently there does not exist a technique that utilizes geofence areas and multicasting to share BSM data with vehicles in the manner described herein. Finally, the process for utilizing geofence areas and multicasting to share BSM data with vehicles conserves computing resources, networking resources, and/or the like that would otherwise be wasted in transmitting unicast messages, scheduling the unicast messages, and/or the like.

As indicated above, FIGS. 1A-1O are provided merely as examples. Other examples may differ from what was described with regard to FIGS. 1A-1O. The number and arrangement of devices and networks shown in FIGS. 1A-1O are provided as an example. In practice, there may be additional devices and/or networks, fewer devices and/or networks, different devices and/or networks, or differently arranged devices and/or networks than those shown in FIGS. 1A-1O. Furthermore, two or more devices shown in FIGS. 1A-1O may be implemented within a single device, or a single device shown in FIGS. 1A-1O may be implemented as multiple, distributed devices. Additionally, or alternatively, a set of devices (e.g., one or more devices) of FIGS. 1A-1O may perform one or more functions described as being performed by another set of devices of FIGS. 1A-1O.

Figure 2:
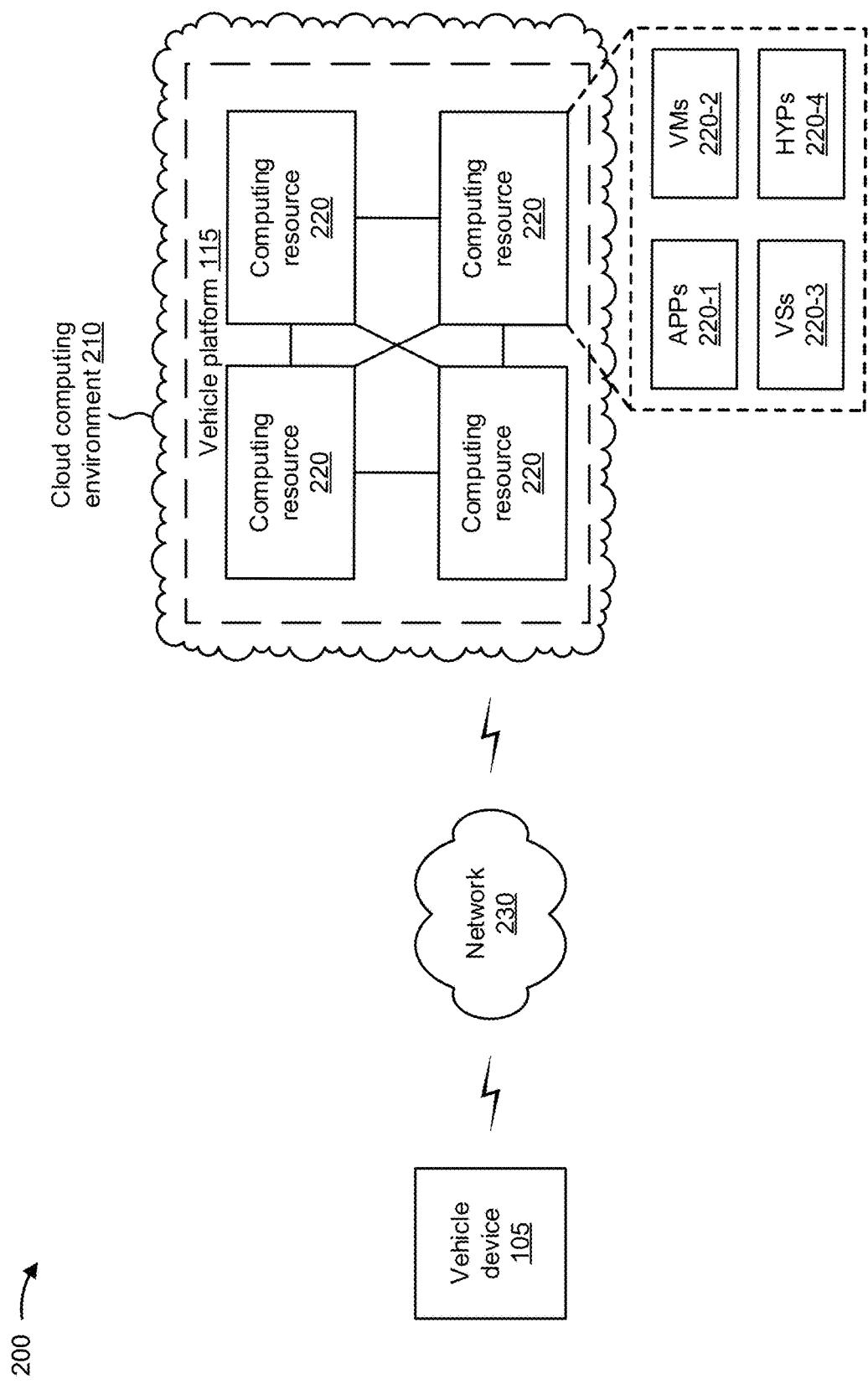
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include vehicle device 105, vehicle platform 115, and a network 230. Devices of environment 200 may interconnect via wired connections, wireless connections, or a combination of wired and wireless connections.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global positioning system (GPS) device, a real-time kinematics (RTK) device, an OBD device, an ECU, a dash camera, a parking assist camera, a backup assist camera, a vehicle infotainment system, a vehicle navigation system, and/or the like) or a similar type of device. In some implementations, vehicle device 105 may receive information from and/or transmit information to vehicle platform 115.

Vehicle platform 115 includes one or more devices that utilize geofence areas and multicasting to share basic safety message (BSM) data with vehicles. In some implementations, vehicle platform 115 may be designed to be modular such that certain software components may be swapped in or out depending on a particular need. As such, vehicle platform 115 may be easily and/or quickly reconfigured for different uses. In some implementations, vehicle platform 115 may receive information from and/or transmit information to one or more vehicle devices 105.

In some implementations, as shown, vehicle platform 115 may be hosted in a cloud computing environment 210. Notably, while implementations described herein describe vehicle platform 115 as being hosted in cloud computing environment 210, in some implementations, vehicle platform 115 may not be cloud-based (i.e., may be implemented outside of a cloud computing environment) or may be partially cloud-based.

Cloud computing environment 210 includes an environment that hosts vehicle platform 115. Cloud computing environment 210 may provide computation, software, data access, storage, etc., services that do not require end-user knowledge of a physical location and configuration of system(s) and/or device(s) that hosts vehicle platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host vehicle platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by vehicle device 105. Application 220-1 may eliminate a need to install and execute the software applications on vehicle device 105. For example, application 220-1 may include software associated with vehicle platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS").

A process virtual machine may execute a single program and may support a single process. In some implementations, virtual machine 220-2 may execute on behalf of a user (e.g., a user of vehicle device 105 or an operator of vehicle platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
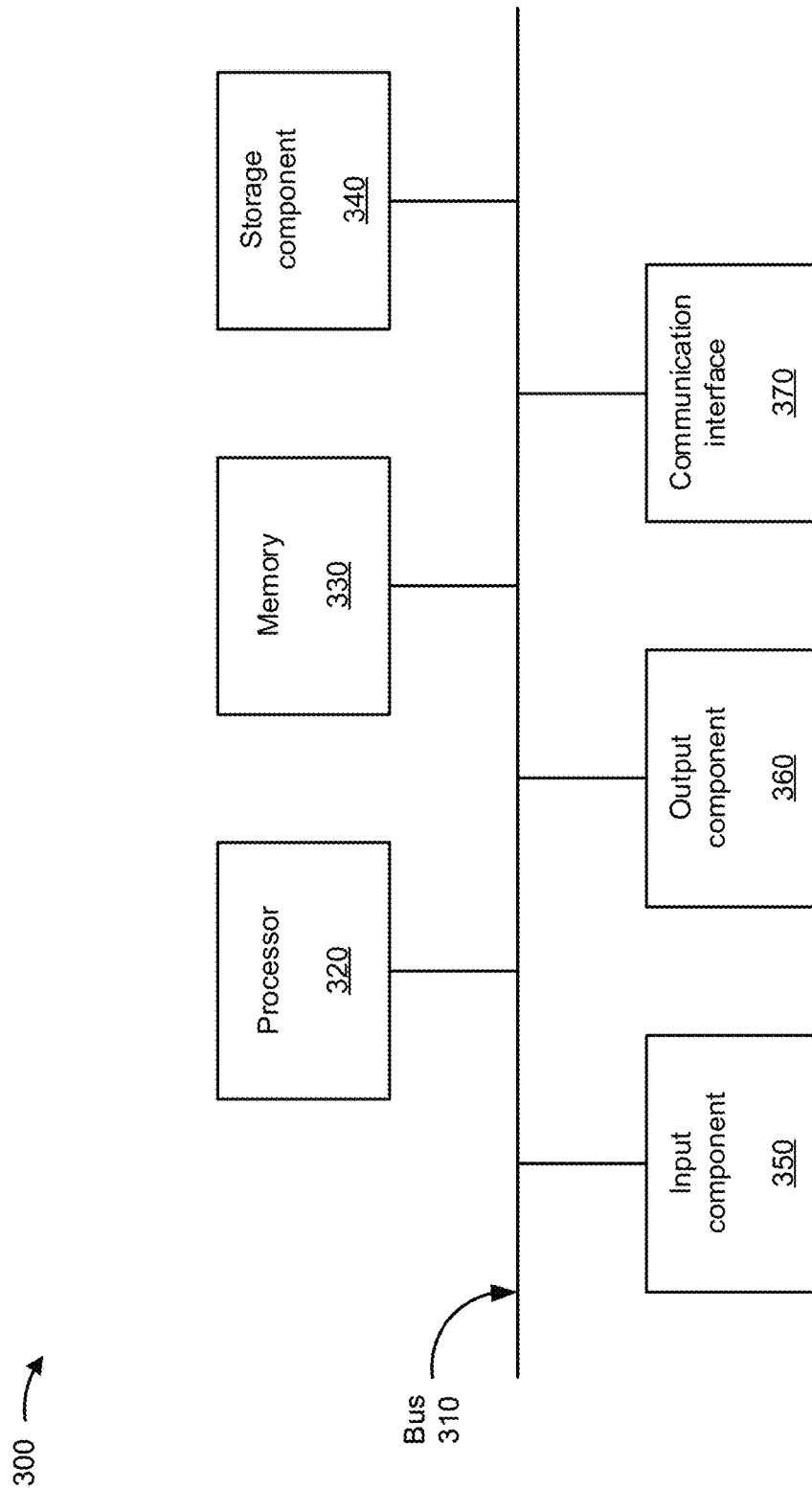
FIG. 3 is a diagram of example components of one or more devices of FIG. 2.

FIG. 3 is a diagram of example components of a device 300. Device 300 may correspond to vehicle device 105, vehicle platform 115, and/or computing resource 220. In some implementations, vehicle device 105, vehicle platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing geofence areas and multicasting to share basic safety message (BSM) data with vehicles. In some implementations, one or more process blocks of FIG. 4 may be performed by a device (e.g., vehicle platform 115). In some implementations, one or more process blocks of FIG. 4 may be performed by another device or a group of devices separate from or including the device, such as a vehicle device (e.g., vehicle device 105).

As shown in FIG. 4, process 400 may include receiving basic safety message data from one or more vehicles (block 410). For example, the device (e.g., using computing resource 220, processor 320, communication interface 370, and/or the like) may receive basic safety message data from one or more vehicles, as described above. The basic safety message data may include data identifying sizes of the one or more vehicles, positions of the one or more vehicles, speeds of the one or more vehicles, headings of the one or more vehicles, accelerations of the one or more vehicles, or statuses of brake systems of the one or more vehicles.

As further shown in FIG. 4, process 400 may include determining, based on a quantity of the one or more vehicles and speed data identified in the basic safety message data, a primary geofence area that includes a first set of the one or more vehicles (block 420). For example, the device (e.g., using computing resource 220, processor 320, memory 330, and/or the like) may determine, based on a quantity of the one or more vehicles and speed data identified in the basic safety message data, a primary geofence area that includes a first set of the one or more vehicles, as described above. The speed data may include data identifying respective speeds of one or more vehicles traveling in the secondary geofence area, or one or more speed limits in the secondary geofence area.

As further shown in FIG. 4, process 400 may include determining a secondary geofence area based on the speed data and the quantity of the one or more vehicles, wherein the secondary geofence area is greater in size than the primary geofence area (block 430). For example, the device (e.g., using computing resource 220, processor 320, storage component 340, and/or the like) may determine a secondary geofence area based on the speed data and the quantity of the one or more vehicles, as described above. In some implementations, the secondary geofence area may be greater in size than the primary geofence area. In some implementations, each of the primary geofence area and the secondary geofence area includes an irregular shape. In some implementations, the primary geofence area and the secondary geofence area may be substantially similar in shape and may share a center point. In some implementations, sizes of the primary geofence area and the secondary geofence area may vary based on respective speeds of one or more vehicles traveling in the primary geofence area and the secondary geofence area. In some implementations, the primary geofence area and the secondary geofence area may be polygonal in shape.

As further shown in FIG. 4, process 400 may include determining a difference between the primary geofence area and the secondary geofence area to generate a difference geofence area that includes a second set of the one or more vehicles, wherein the first set of the one or more vehicles is different than the second set of the one or more vehicles (block 440). For example, the device (e.g., using computing resource 220, processor 320, memory 330, storage component 340, and/or the like) may determine a difference between the primary geofence area and the secondary geofence area to generate a difference geofence area that includes a second set of the one or more vehicles, as described above. In some implementations, the first set of the one or more vehicles may be different than the second set of the one or more vehicles.

As further shown in FIG. 4, process 400 may include generating a multicast message based on the basic safety message data associated with the second set of the one or more vehicles (block 450). For example, the device (e.g., using computing resource 220, processor 320, memory 330, and/or the like) may generate a multicast message based on the basic safety message data associated with the second set of the one or more vehicles, as described above.

As further shown in FIG. 4, process 400 may include broadcasting the multicast message to the first set of the one or more vehicles (block 460). For example, the device (e.g., using computing resource 220, processor 320, memory 330, storage component 340, communication interface 370, and/or the like) may broadcast the multicast message to the first set of the one or more vehicles, as described above. In some implementations, the vehicles and/or the vehicle devices may utilize the multicast messages to prevent vehicle accidents, to maneuver to avoid vehicle accidents, to discern locations of other vehicles, and/or the like.

Process 400 may include additional implementations, such as any single implementation or any combination of implementations described below and/or in connection with one or more other processes described elsewhere herein.

In some implementations, process 400 may include determining adjacent geofence areas to the primary geofence area based on the basic safety message data, wherein the adjacent geofence areas may include a third set of the one or more vehicles.

In some implementations, process 400 may include generating another multicast message based on the basic safety message data associated with the third set of the one or more vehicles; and broadcasting the other multicast message to the first set of the one or more vehicles.

In some implementations, process 400 may include determining one or more shifted secondary geofence areas, based on the basic safety message data, to generate another difference geofence area that includes a third set of the one or more vehicles, wherein the one or more shifting secondary geofence areas may be shifted relative to the primary geofence area. In some implementations, the one or more shifted secondary geofence areas may be shifted at particular angles relative to a center point of the primary geofence area.

In some implementations, process 400 may include generating another multicast message based on the basic safety message data associated with the third set of the one or more vehicles, and broadcasting the other multicast message to the first set of the one or more vehicles.

In some implementations, process 400 may include generating another multicast message based on the basic safety message data associated with the first set of the one or more vehicles, and broadcasting the other multicast message to the second set of the one or more vehicles.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   determining, by a device, a difference geofence area based on determining a difference between a primary geofence area and a secondary geofence area,
   wherein the primary geofence area includes a first set of vehicles within boundaries of the primary geofence area,
   wherein the secondary geofence area is greater in size than the primary geofence area, and
   wherein the difference geofence area includes a second set of vehicles that is different than the first set of vehicles, within boundaries of the difference geofence area;
   generating, by the device and based on basic safety message (BSM) data associated with the second set of vehicles, a message;
   determining, by the device, a quantity of multicast messages for the primary geofence area based on at least one of:
   an average quantity of vehicles per geofence, or
   a quantity of multicast messages per second per vehicle; and
   multicasting, by the device and based on the quantity of multicast messages, the message to the first set of vehicles.

2. The method of claim 1, further comprising:
   determining the primary geofence area and the secondary geofence area based on speed data and information associated with a quantity of vehicles identified in BSM data associated with one or more vehicles that includes the first set of vehicles and the second set of vehicles.

3. The method of claim 1, further comprising:
   determining adjacent geofence areas that are adjacent to the primary geofence area based on BSM data associated with one or more vehicles,
   wherein the adjacent geofence areas include a third set of vehicles that is different than the first set of vehicles;
   generating another message based on the BSM data associated with the third set of vehicles; and
   multicasting the another message to the first set of vehicles.

4. The method of claim 1, further comprising:
   determining shifted geofence areas based on BSM data associated with one or more vehicles,
   wherein the shifted geofence areas are shifted relative to the primary geofence area;
   generating another difference geofence area based on determining a difference between the primary geofence area and the shifted geofence area,
   wherein the shifted geofence area includes a third set of vehicles that is different than the first set of vehicles;
   generating another message based on BSM data associated with the third set of vehicles; and
   multicasting the another message to the first set of vehicles.

5. The method of claim 1, further comprising:
   varying sizes of the primary geofence area and the secondary geofence area based on respective speeds of one or more vehicles traveling in the primary geofence area and the secondary geofence area.

6. The method of claim 1, wherein the BSM data includes data identifying:
   a size of one or more vehicles,
   a position of the one or more vehicles,
   a speed of the one or more vehicles,
   a heading of the one or more vehicles,
   an acceleration of the one or more vehicles,
   a status of brake systems of the one or more vehicles, or
   a predicted path of the one or more vehicles.

7. The method of claim 1, further comprising:
   receiving BSM data associated with the first set of vehicles; and
   generating, based on the BSM data associated with the first set of vehicles, another message for multicasting.

8. The method of claim 1, wherein the quantity of multicast messages for the primary geofence area is further based on a difference between a quantity of vehicles included in the secondary geofence area and a quantity of vehicles included in the primary geofence area.

9. A device, comprising:
   one or more memories; and
   one or more processors, communicatively coupled to the one or more memories, configured to:
   determine a difference geofence area based on determining a difference between a primary geofence area and a secondary geofence area,
   wherein the primary geofence area includes a first set of vehicles within boundaries of the primary geofence area,
   wherein the secondary geofence area is greater in size than the primary geofence area, and
   wherein the difference geofence area includes a second set of vehicles that is different than the first set of vehicles, within boundaries of the difference geofence area;
   generate a message based on basic safety message (BSM) data associated with the second set of vehicles;
   determine a quantity of multicast messages for the primary geofence area based on at least one of:
   an average quantity of vehicles per geofence, or
   a quantity of multicast messages per second per vehicle; and
   multicast, based on the quantity of multicast messages, the message to the first set of vehicles.

10. The device of claim 9, wherein the one or more processors are further configured to:
    determine the primary geofence area and the secondary geofence area based on speed data and information associated with a quantity of vehicles identified in BSM data associated with one or more vehicles that includes the first set of vehicles and the second set of vehicles.

11. The device of claim 9, wherein the one or more processors are further configured to:
    determine adjacent geofence areas that are adjacent to the primary geofence area based on BSM data associated with one or more vehicles,
    wherein the adjacent geofence areas include a third set of vehicles that is different than the first set of vehicles;
    generate another message based on the BSM data associated with the third set of vehicles; and
    multicast the another message to the first set of vehicles.

12. The device of claim 9, wherein the one or more processors are further configured to:
    determine shifted geofence areas based on BSM data associated with one or more vehicles, wherein the shifted geofence areas are shifted relative to the primary geofence area;
generate another difference geofence area based on determining a difference between the primary geofence area and the shifted geofence area,
wherein the shifted geofence area includes a third set of vehicles that is different than the first set of vehicles;
generate another message based on BSM data associated with the third set of vehicles; and
multicast the another message to the first set of vehicles.

13. The device of claim 9, wherein the one or more processors are further configured to:
vary sizes of the primary geofence area and the secondary geofence area based on respective speeds of one or more vehicles traveling in the primary geofence area and the secondary geofence area.

14. The device of claim 9, wherein the BSM data includes data identifying:
a size of one or more vehicles,
a position of the one or more vehicles,
a speed of the one or more vehicles,
a heading of the one or more vehicles,
an acceleration of the one or more vehicles,
a status of brake systems of the one or more vehicles, or
a predicted path of the one or more vehicles.

15. The device of claim 9, wherein the one or more processors are further configured to:
receive BSM data associated with the first set of vehicles; and
generate, based on the BSM data associated with the first set of vehicles, another message for multicasting.

16. A non-transitory computer-readable medium storing a set of instructions, the set of instructions comprising:
one or more instructions that, when executed by one or more processors of a device, cause the device to:
determine a difference geofence area based on determining a difference between a primary geofence area and a secondary geofence area,
wherein the primary geofence area includes a first set of vehicles within boundaries of the primary geofence area,
wherein the secondary geofence area is greater in size than the primary geofence area, and
wherein the difference geofence area includes a second set of vehicles that is different than the first set of vehicles, within boundaries of the difference geofence area;
generate, based on basic safety message (BSM) data associated with the second set of vehicles, a message;
determine a quantity of multicast messages for the primary geofence area based on at least one of:
an average quantity of vehicles per geofence, or
a quantity of multicast messages per second per vehicle; and
multicast, based on the quantity of multicast messages, the message to the first set of vehicles.

17. The non-transitory computer-readable medium of claim 16, wherein the one or more instructions further cause the device to:
determine the primary geofence area and the secondary geofence area based on speed data and information associated with a quantity of vehicles identified in BSM data associated with one or more vehicles that includes the first set of vehicles and the second set of vehicles.

18. The non-transitory computer-readable medium of claim 16, wherein the one or more instructions further cause the device to:
determine adjacent geofence areas that are adjacent to the primary geofence area based on BSM data associated with one or more vehicles,
wherein the adjacent geofence areas include a third set of vehicles that is different than the first set of vehicles;
generate another message based on the BSM data associated with the third set of vehicles; and
multicast the another message to the first set of vehicles.

19. The non-transitory computer-readable medium of claim 16, wherein the one or more instructions further cause the device to:
determine shifted geofence areas based on BSM data associated with one or more vehicles,
wherein the shifted geofence areas are shifted relative to the primary geofence area; and
generate another difference geofence area based on determining a difference between the primary geofence area and the shifted geofence area,
wherein the shifted geofence area includes a third set of vehicles that is different than the first set of vehicles;
generate another message based on BSM data associated with the third set of vehicles; and
multicast the another message to the first set of vehicles.

20. The non-transitory computer-readable medium of claim 16, wherein the one or more instructions further cause the device to:
vary sizes of the primary geofence area and the secondary geofence area based on respective speeds of one or more vehicles traveling in the primary geofence area and the secondary geofence area.

* * * * *